(12) United States Patent
Liang

(10) Patent No.: US 10,717,362 B2
(45) Date of Patent: Jul. 21, 2020

(54) MANAGING AND MONITORING CAR-BATTERY TO EFFECTIVELY AND SAFELY SUPPLY ENERGY TO ELECTRICALLY POWERED VEHICLES

(71) Applicant: Shwu-Jian Liang, Taida (CN)

(72) Inventor: Shwu-Jian Liang, Taida (CN)

(73) Assignee: Shwu-Jian Liang, Dayton, OH (US)

( * ) Notice: Subject to any disclaimer, the term of this patent is extended or adjusted under 35 U.S.C. 154(b) by 988 days.

(21) Appl. No.: 15/258,952

(22) Filed: Sep. 7, 2016

(65) Prior Publication Data

US 2018/0009323 A1 Jan. 11, 2018

Related U.S. Application Data

(62) Division of application No. 13/743,371, filed on Jan. 17, 2013, now abandoned.

(Continued)

(51) Int. Cl.

| | |
|---|---|
| *H01M 10/44* | (2006.01) |
| *H01M 10/46* | (2006.01) |
| *B60L 11/18* | (2006.01) |
| *G06Q 30/06* | (2012.01) |
| *B60L 53/30* | (2019.01) |
| *B60L 53/68* | (2019.01) |
| *B60L 53/31* | (2019.01) |
| *B60L 53/65* | (2019.01) |

(Continued)

(52) U.S. Cl.
CPC ......... *B60L 11/1822* (2013.01); *B60L 53/305* (2019.02); *B60L 53/31* (2019.02); *B60L 53/65* (2019.02); *B60L 53/665* (2019.02); *B60L 53/68* (2019.02); *B60L 53/80* (2019.02); *B60L 58/12* (2019.02); *B60L 58/16* (2019.02); *B60L 58/21* (2019.02); *G06K 7/10297* (2013.01); *G06K 19/0723* (2013.01); *G06Q 30/0645* (2013.01); *B60L 2240/545* (2013.01); *B60L 2240/547* (2013.01); *B60L 2240/549* (2013.01); *B60L 2240/70* (2013.01); *B60L 2250/10* (2013.01); *Y02T 10/7005* (2013.01); *Y02T 10/705* (2013.01); *Y02T 10/7044* (2013.01); *Y02T 10/7088* (2013.01); *Y02T 10/7291* (2013.01); *Y02T 90/121* (2013.01); *Y02T 90/124* (2013.01); *Y02T 90/128* (2013.01); *Y02T 90/14* (2013.01); *Y02T 90/16* (2013.01); *Y02T 90/163* (2013.01); *Y02T 90/169* (2013.01); *Y04S 30/14* (2013.01)

(58) Field of Classification Search
CPC ...... H02J 7/0004; H02J 7/0008; H02J 7/0021; H02J 7/0026; H02J 7/0027
USPC .......................... 320/104, 107, 109, 132, 149
See application file for complete search history.

(56) References Cited

U.S. PATENT DOCUMENTS

2012/0271723 A1\* 10/2012 Penilla ................... G06Q 20/18
705/16
2013/0282472 A1\* 10/2013 Penilla .................. B60L 53/305
705/14.35

\* cited by examiner

*Primary Examiner* — Edward Tso
(74) *Attorney, Agent, or Firm* — Bo-In Lin

(57) ABSTRACT

The present invention discloses a system for managing rechargeable batteries to provide power to electrical vehicles. The system comprises a plurality of charging stations each if the intelligent charger includes at least an intelligent battery charger for charging the rechargeable batteries. The intelligent battery chargers further comprises a battery diagnostic detector for detecting and storing data of designated battery health management parameters. The intelligent battery chargers further comprises a transmitter for transmitting the data of the designated battery health management parameters as wireless signals to a networked server in a battery management center.

19 Claims, 21 Drawing Sheets

Related U.S. Application Data

(60) Provisional application No. 61/587,466, filed on Jan. 17, 2012.

(51) Int. Cl.
| | | |
|---|---|---|
| *B60L 58/21* | (2019.01) | |
| *B60L 53/80* | (2019.01) | |
| *B60L 58/16* | (2019.01) | |
| *B60L 58/12* | (2019.01) | |
| *B60L 53/66* | (2019.01) | |
| *G06K 7/10* | (2006.01) | |
| *G06K 19/07* | (2006.01) | |

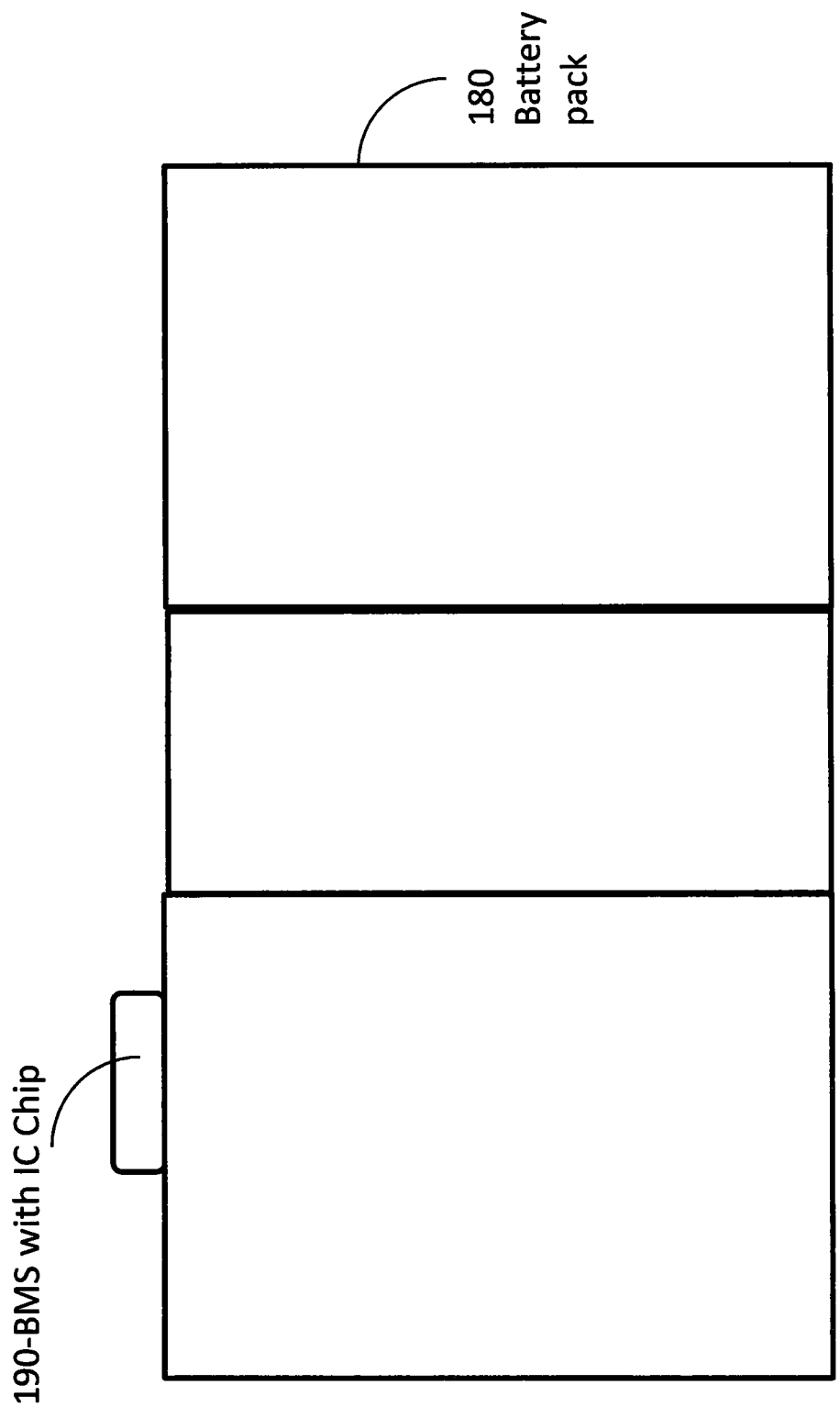
Figure 2 Battery Pack With Battery Management System (BMS)

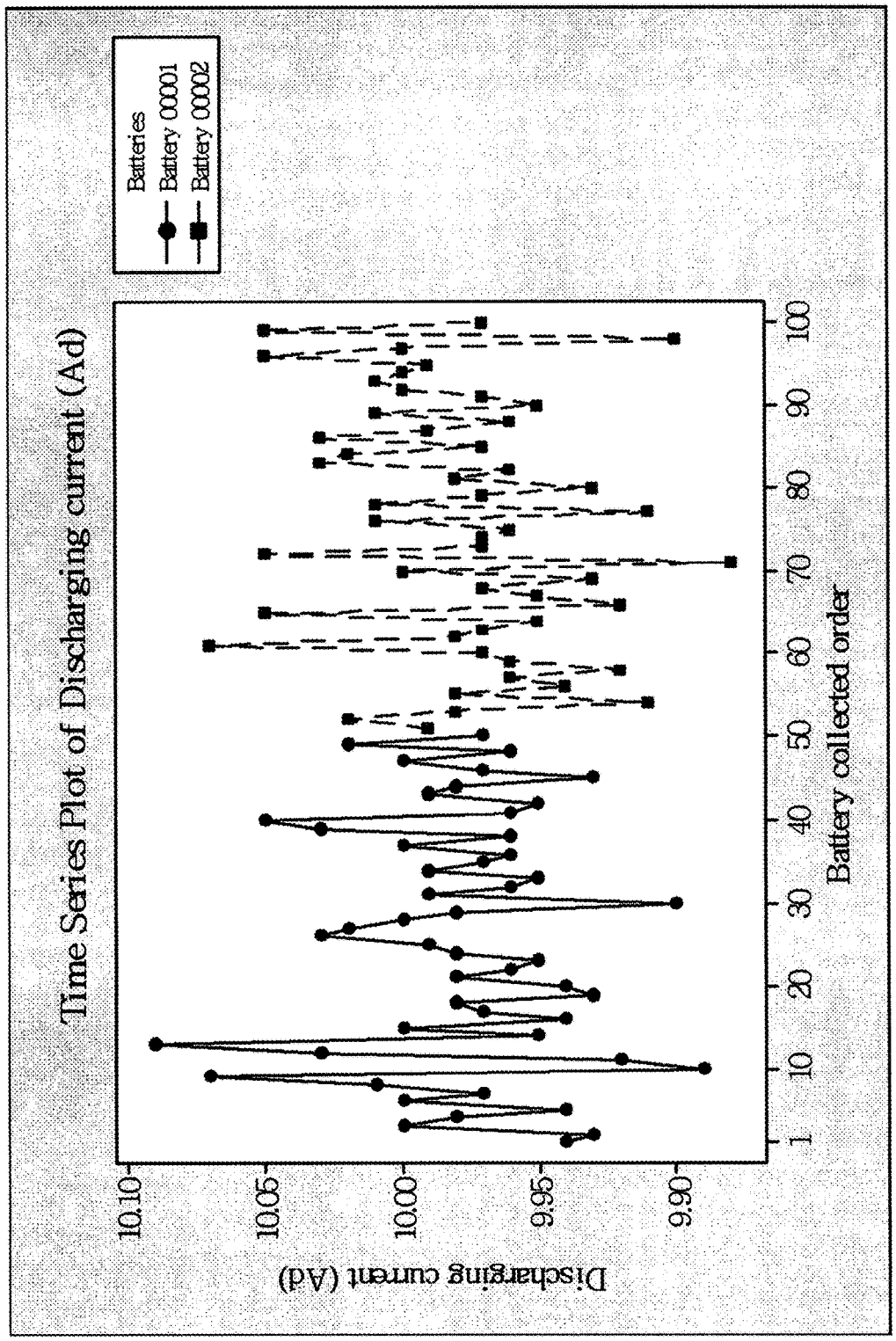
Figure 5-1.1 showing the differentiation of the two batteries.

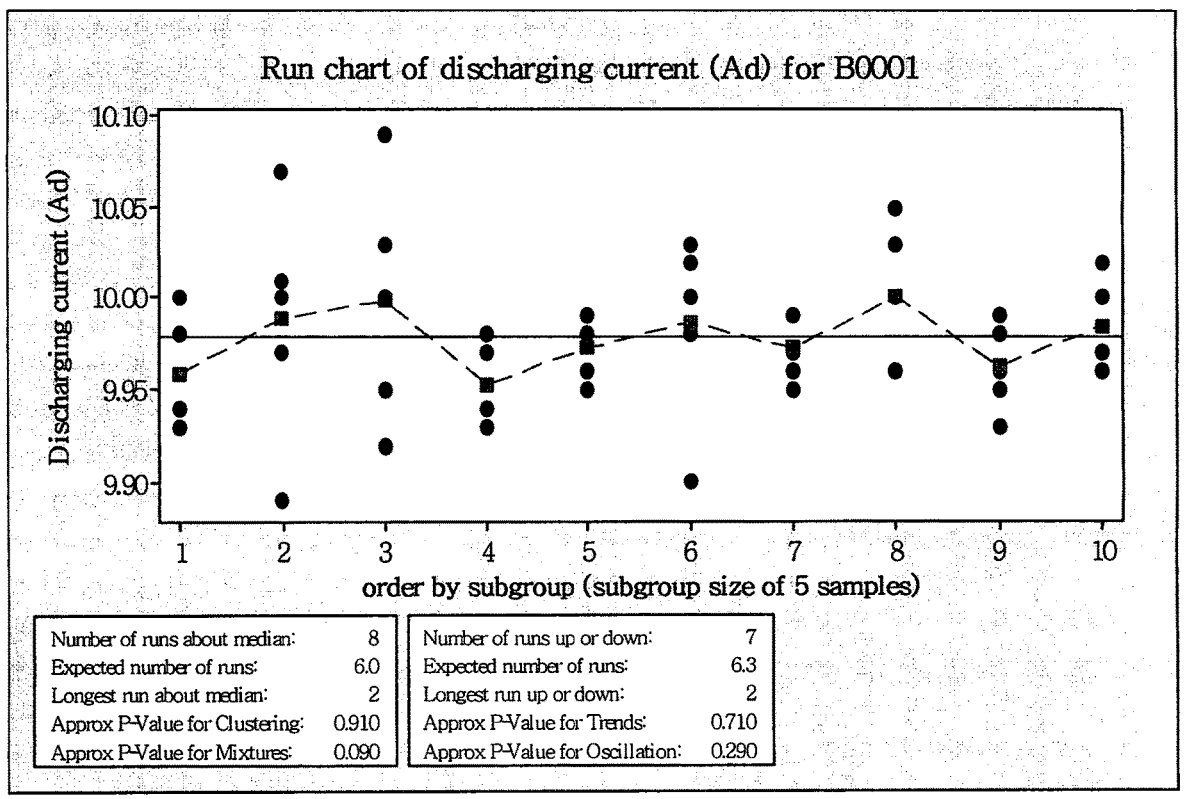
Figure 5.2-1

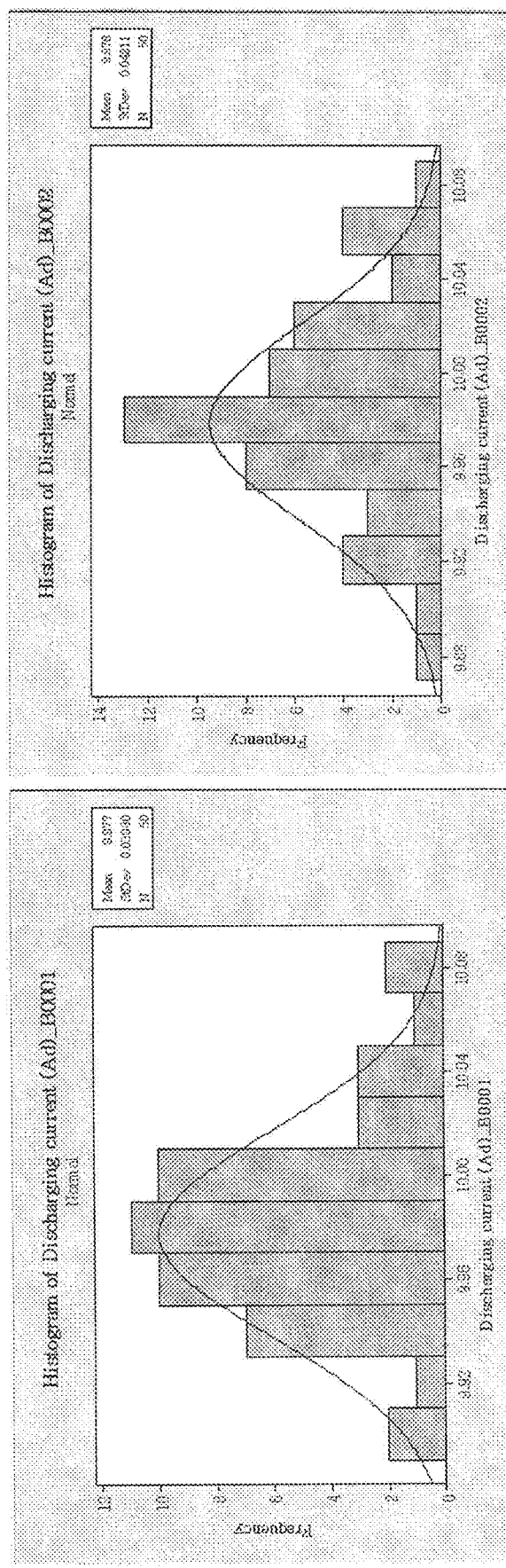
figure 5-3.1 shows the two kinds of battery distribution of measurements.

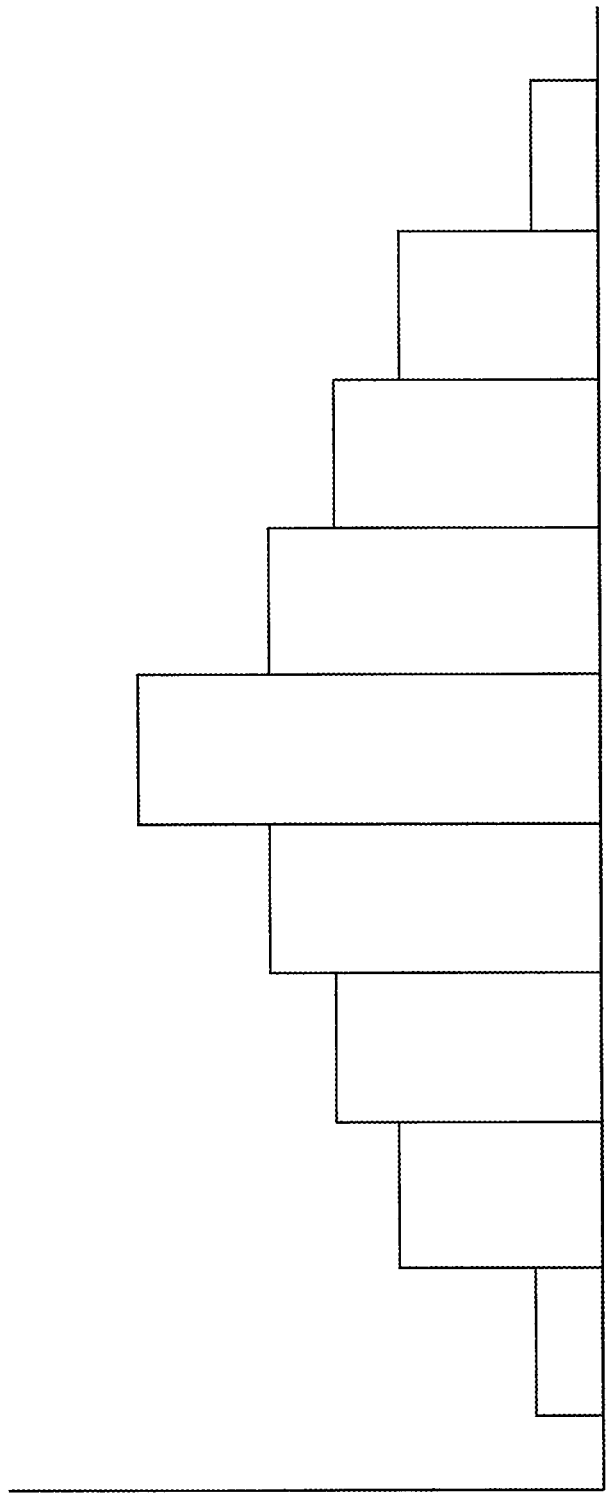
Figure 5-3.2 Normal-distribution shape

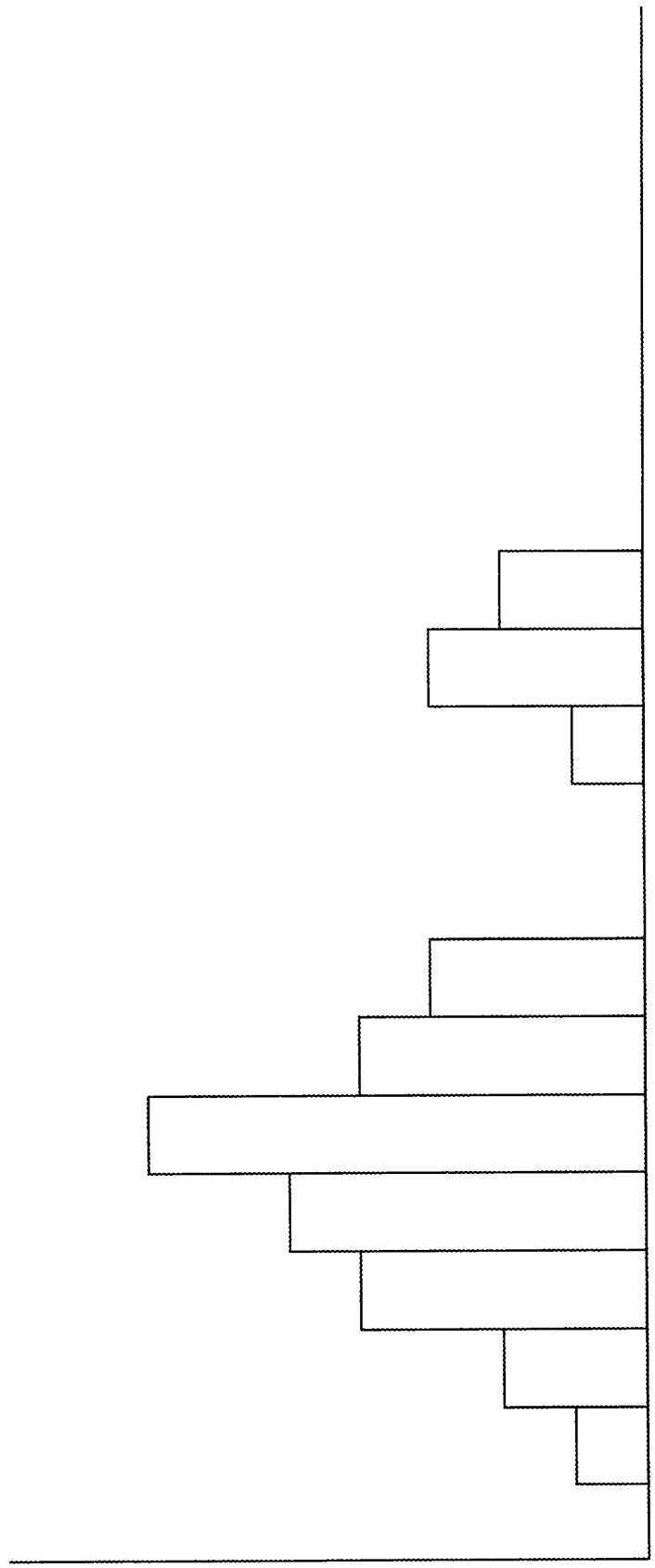
Figure 5-3.3 Isolated-peaked (Edge-peak) shape

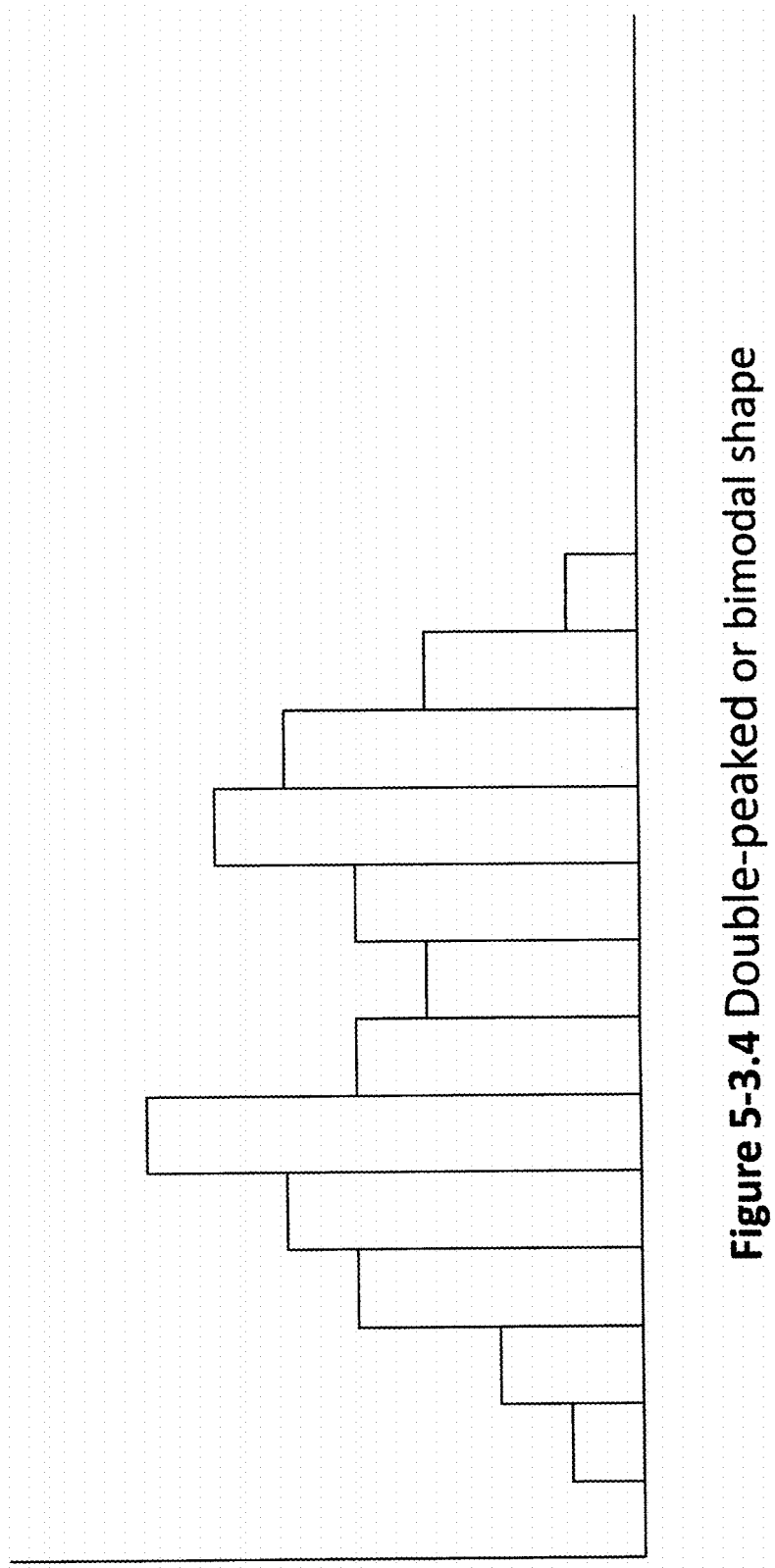
Figure 5-3.4 Double-peaked or bimodal shape

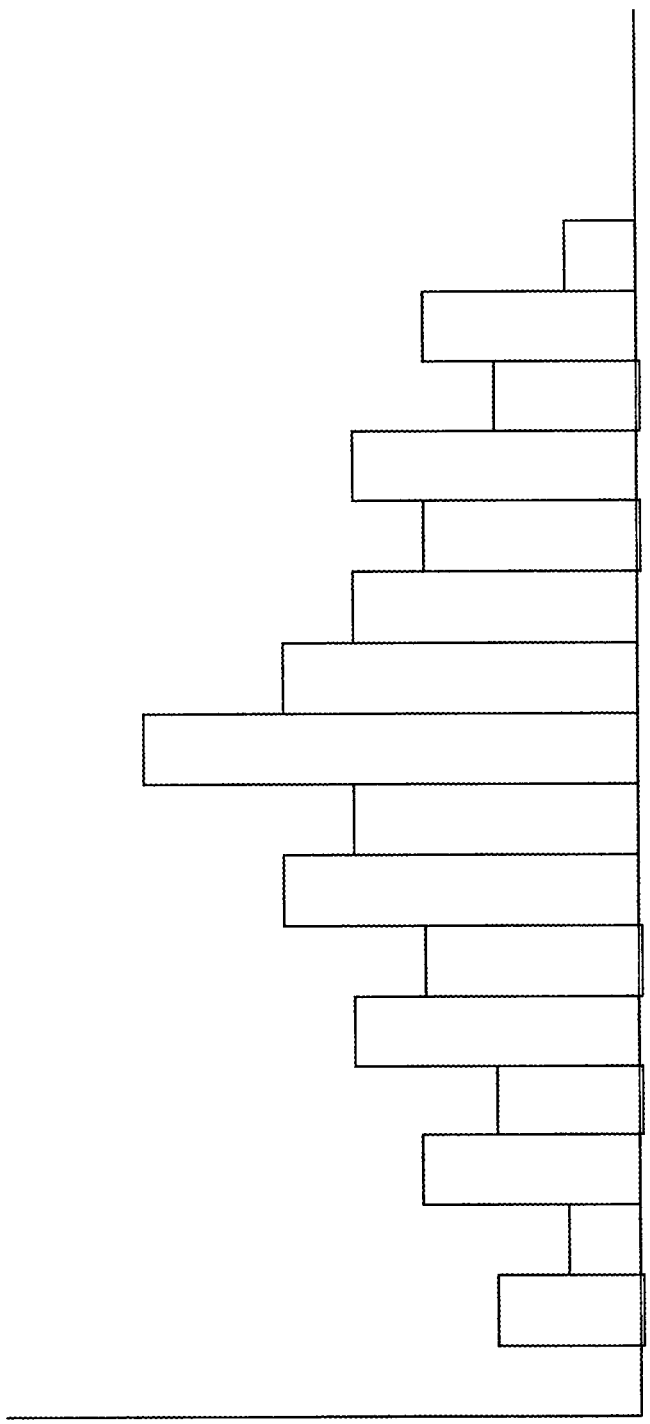
Figure 5-3.5 Cog-toothed (or Combed) shape

Figure 5-3.6 Truncated (or heart-cut) shape

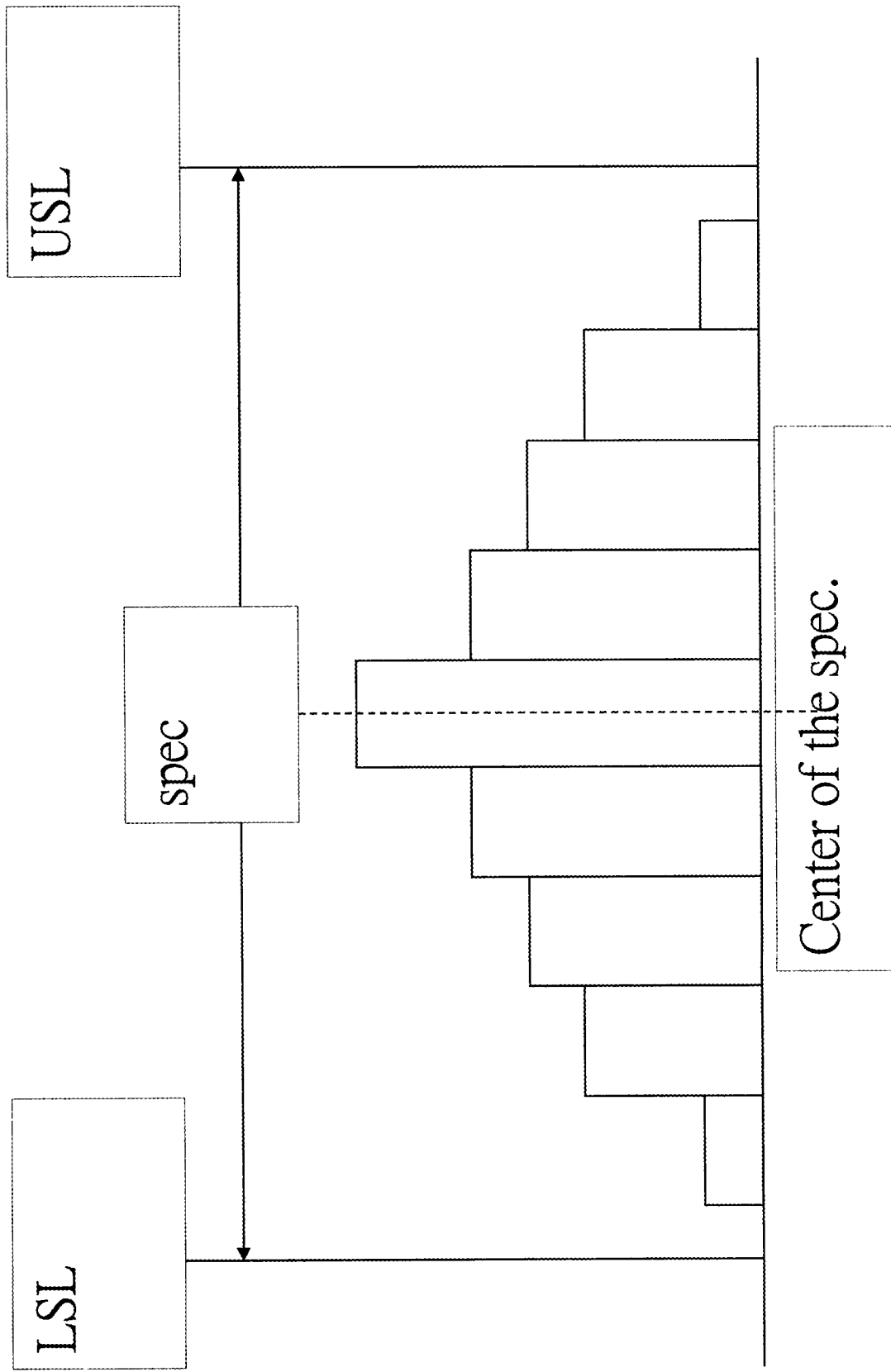
Figure 5-3.7 shows the battery specifications

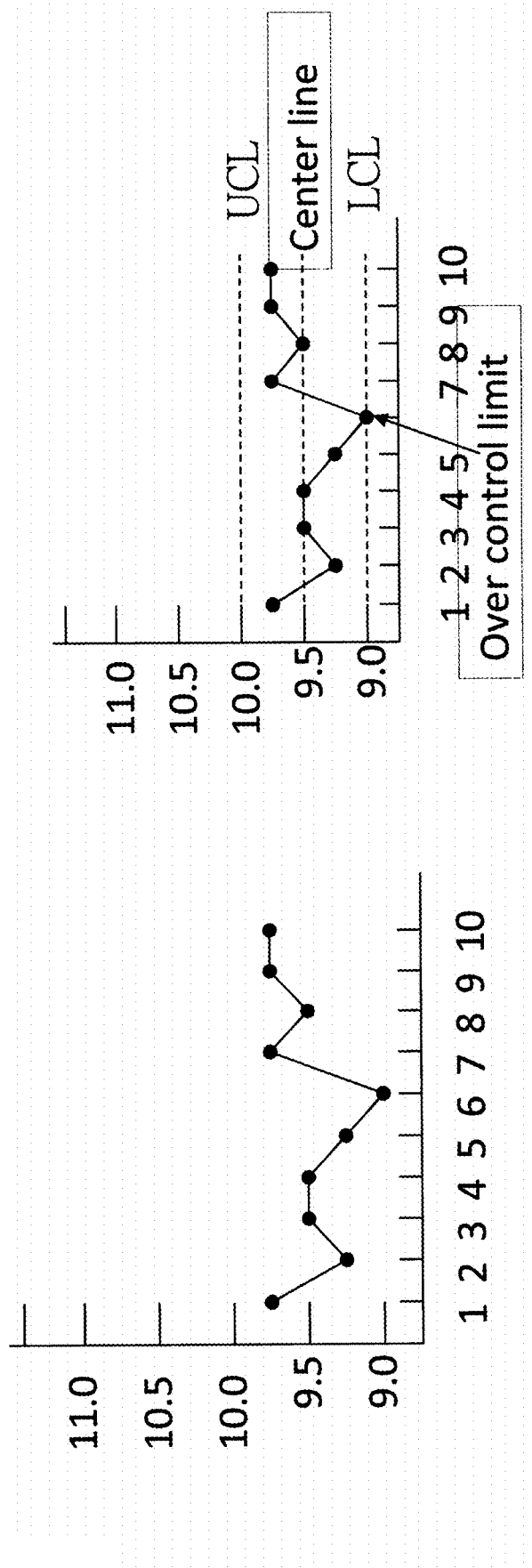
Figure 5-4.1 shows the difference of two charts from run chart to control chart.

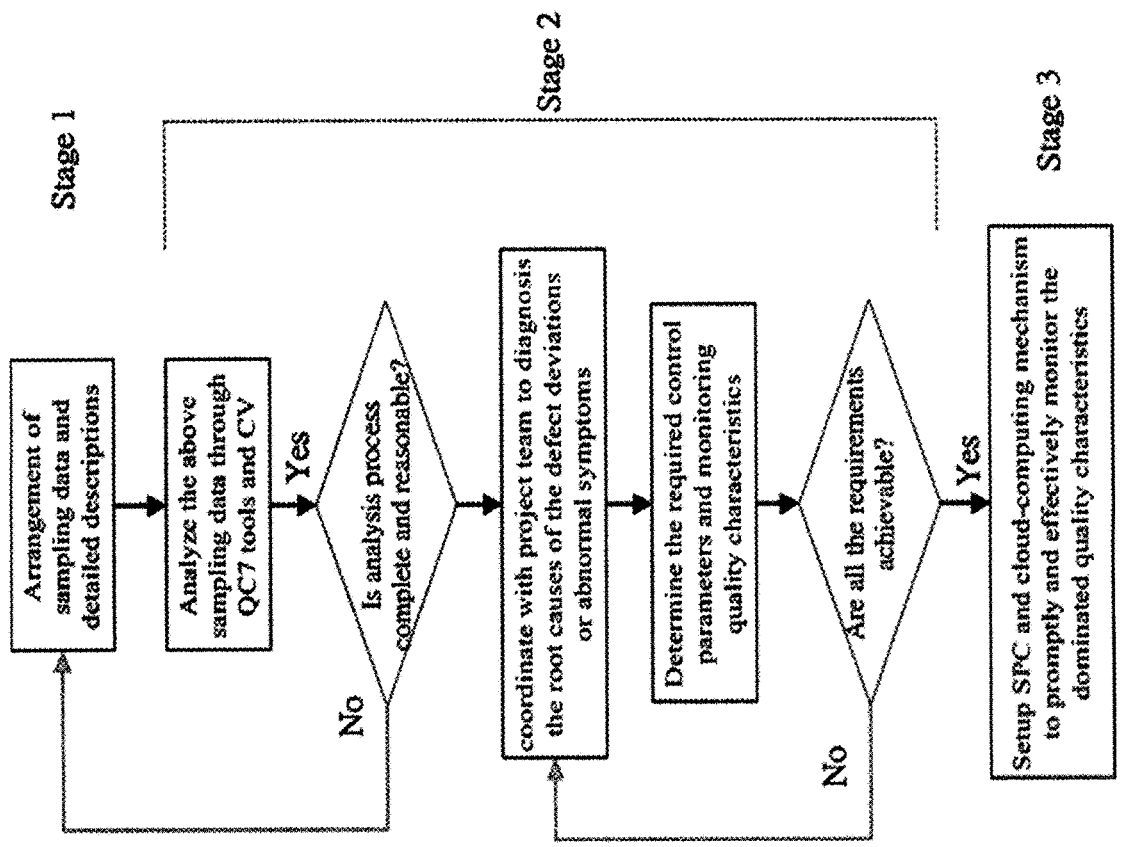
Figure 5-5.1 showing a robust statistical quality control of the Lithium battery.

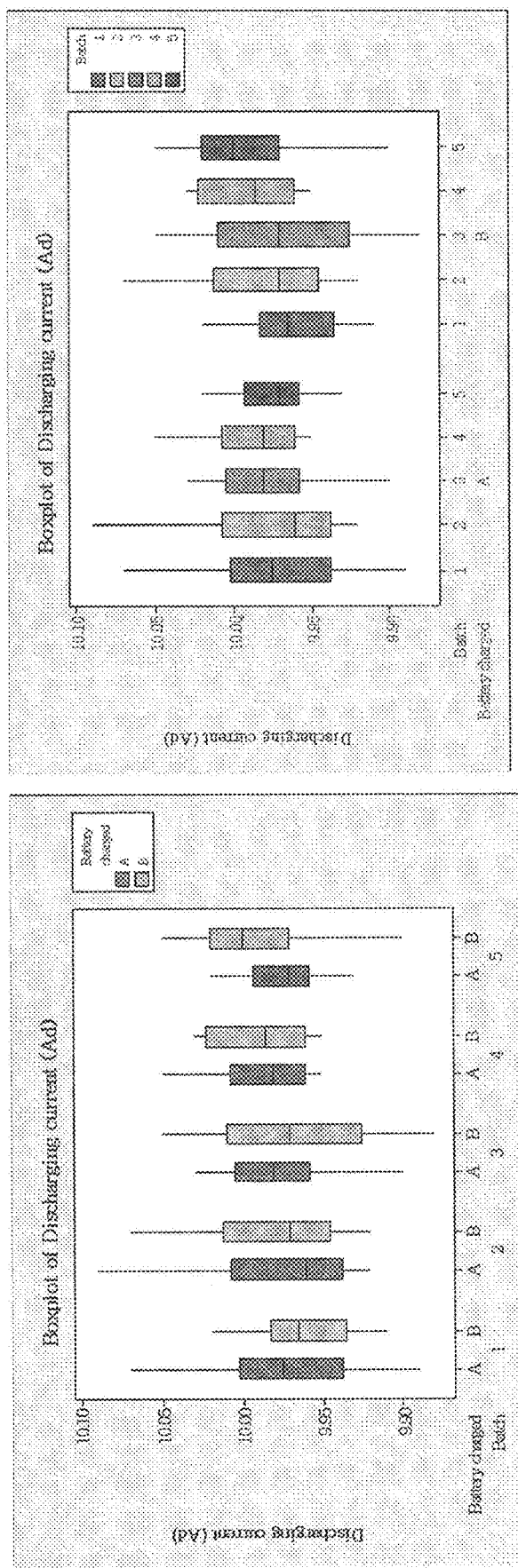
Figure 5-5.2 Box plots of discharging current using multi-dimensional scaling

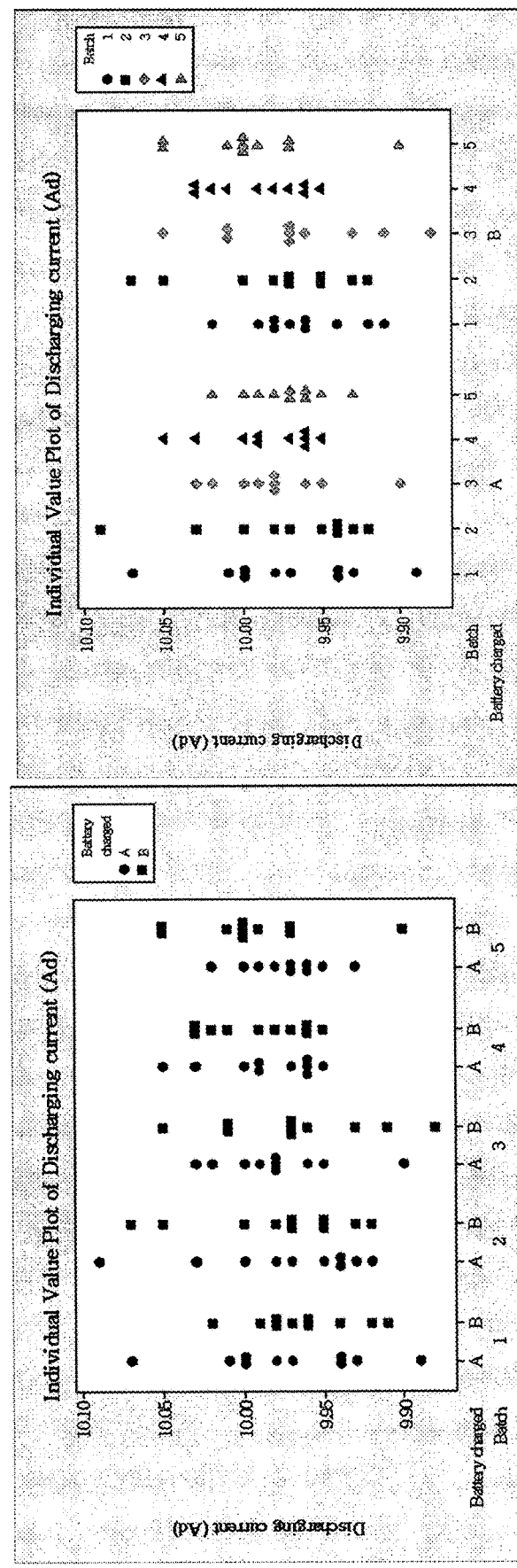
Figure 5-5.3 Individual value plots of discharging current using multi- dimensional scaling

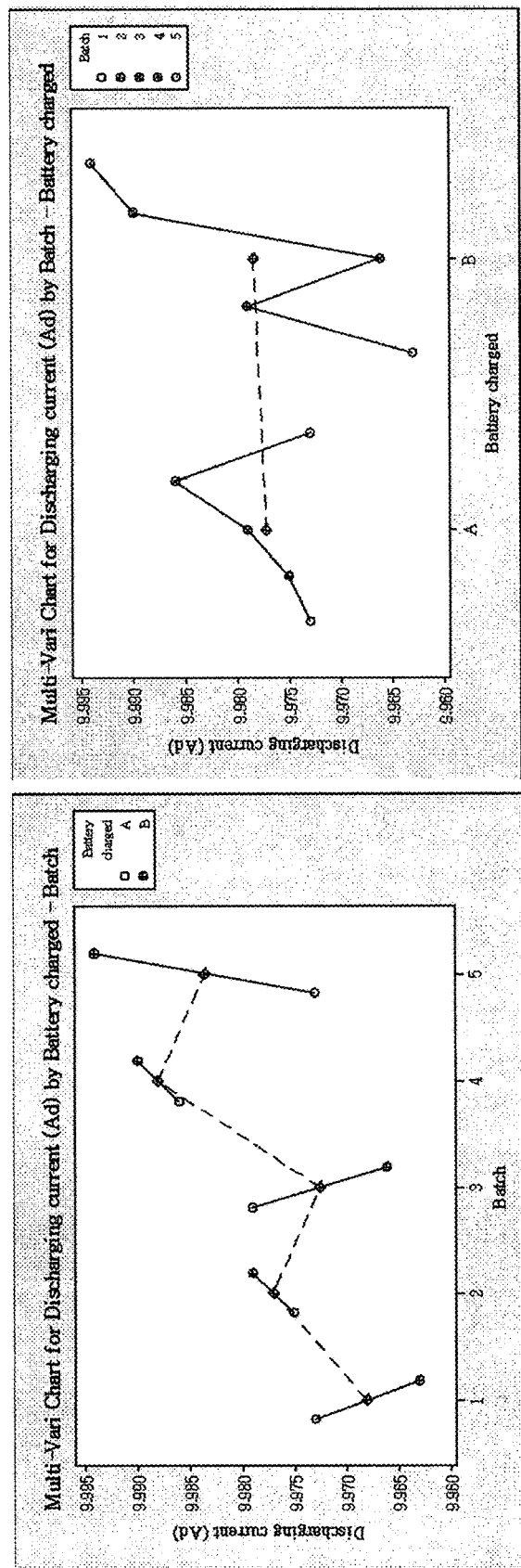
Figure 5-5.4 Multi-vari charts of discharging current using multi-dimensional scaling

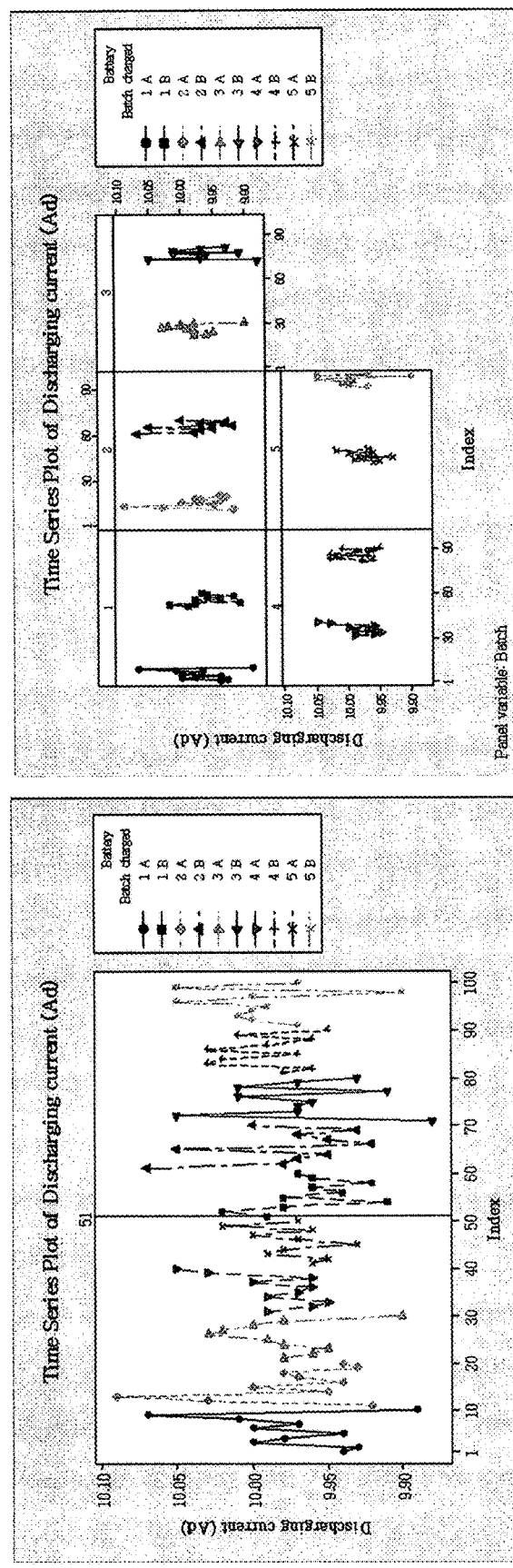
Figure 5-5.5 Time series plot of discharging current using multi-dimensional scaling // MANAGING AND MONITORING CAR-BATTERY TO EFFECTIVELY AND SAFELY SUPPLY ENERGY TO ELECTRICALLY POWERED VEHICLES This application is a Divisional application of a previously filed patent application Ser. No. 13/743,371 filed on Jan. 17, 2013. Application Ser. No. 13/743,371 is a Non-Provisional application based on and claims the Priority of a previously filed Provisional Application 61/587,466 filed by the Applicant of this application on Jan. 17, 2012. The disclosures made in application Ser. No. 13/743,371 and 61/587,466 are hereby incorporated by reference.

FIELD OF THE INVENTION

The present invention relates to systems, apparatuses and methods for supplying energy to electrically powered vehicles (EPV) More particularly, the invention relates to the systems and methods to manage a process for quickly exchanging batteries and meanwhile implementing cloud-computing network connected battery health monitoring devices to transmit signals whereby continuously monitoring the health state of all the batteries in order to effectively and safely supply energy to the electrically powered vehicles.

BACKGROUND OF THE INVENTION

As there are more electrically powered vehicles including the hybrid types of vehicles that draw power partially from the batteries installed on a vehicle, the most challenging technical limitations are related the speed of recharging the batteries and the monitoring and maintenance of the health state and safe operations of the batteries. A driver of the electrically powered vehicle usually do not have time to wait for the prolong periods usually required to charge the batteries. Additionally, the health states of the batteries are critically important not only because the operation of the vehicle depends on the batteries but also the malfunctions of the batteries can cause hazards that may threaten the safety of the drivers and may further lead to public safety concerns.

Even that the gas-electrical hybrid powered vehicles have less concerns for charging the batteries within a short period because the batteries are charged when the engine is powered by burning the gasoline fuel, however, the limited lifetime of the batteries and the health condition of the batteries would still be the important cost and safety factors to take into consideration in owning and operating the gas-electrical hybrid cars. Periodically monitoring the conditions of the battery and proper maintenance of the batteries are still important and good operational routines a vehicle owner should practice for economically and safely operating the vehicle.

Additionally, limited energy storage in the battery is still limiting the total miles; an electrical car is able to travel before the total stored battery power is exhausted. Furthermore, even with improved charge techniques now explored and disclosed, the speed of charging up a battery for an electricity to continue the journey would still be too limiting compared to the time required a stop at a gas station to fill up the tank.

Therefore, a need still exists in the field of vehicle battery and energy supply to provide a new and improved systems and methods to resolved all the above discussed difficulties and limitations.

SUMMARY OF THE INVENTION

In one aspect, the present invention provides a battery exchange and/or lease system for a vehicle owner to make a stop at a battery refueling station when the battery on the car has already had a low capacity which can be quickly removed, and another battery that is fully charged is installed such that the battery "refueling" process may be executed quickly without being limited by the speed of recharging the batteries. Instead of owning the batteries, the owner or operator of the car may just lease the batteries or use the energy stored in the batteries under different energy purchase agreements required to drive the car for certain distance.

It is another aspect of this invention that each of the battery chargers or each of the batteries further includes a battery health state monitoring system. In a preferred embodiment, the system is implemented as an integrated circuit (IC) chip implemented with processes and functions for controlling certain sensing/measuring devices and also for receiving signals from these devices for continuously or periodically detecting designated operational or charging parameters of a battery as indicators for monitoring the conditions and providing diagnoses of any potential problems of the batteries.

It is another aspect of this invention that the IC chip is implemented as a controlling-and-monitoring system on chip that includes detecting and monitoring functions on a battery charging device for measuring and monitoring the conditions of the battery in every battery charge operation. In a preferred embodiment, the controlling-and-monitoring system on chip further includes a transmitter for transmitting signals to specific signal receivers through local area network (LAN) WiFi/Wide area network (WAN) WiMAX, and/or wired Internet such that the measured parameters as indicators of the conditions of the battery can be monitored and applied for safe operation optimally charging and maintaining the batteries in a safe and healthy condition In one preferred embodiment, this invention discloses a method to supply electrical energy to a vehicle. The method includes a step of setting up battery refueling stations on a roadside. The method further includes a step of a driver driving a vehicle to the refuel station for the refuel station to carry out a process of removing charge-depleted batteries from the vehicle and installing full charged battery for supplying power to the vehicle onto the vehicle such that a vehicle driver does not have to wait for a prolong battery recharge period. It may also be charged overnight at home with designated intelligent charger.

In another embodiment, the present invention discloses a battery for providing energy to drive an engine of a vehicle. The battery further includes a controlling-and-monitoring system on chip implemented on an integrated circuit (IC) chip comprising sensing elements for detecting battery parameters indicating important conditions of the battery. In another embodiment, the controlling-and-monitoring system on chip that implemented on the IC chip further includes a transmitter for transmitting signals based on the battery parameters detected by the sensing elements (i.e., sensors). In another embodiment, this invention further includes a network for signal transmission for transmitting signals based on the battery parameters to a signal receiver for receiving, processing and monitoring the conditions of the battery.

While the novel features of the invention are set forth with particularly in the appended claims, the invention, both as to organization and content, will be better understood and appreciated, along with other objects and features thereof, from the following detailed description taken in conjunction with the drawings.

BRIEF DESCRIPTION OF THE DRAWINGS

FIG. 2 is diagram to show a battery implemented as a controlling-and-monitoring system on chip integrates as an IC chip with certain sensing capability and other sensing device such as thermal sensor for detecting battery parameters for monitoring and maintain health operation of the battery.

FIG. 5.1-1 is a diagram for showing the differentiation of the two batteries by stratify the collected discharging current (Ad) data.

FIG. 5.2-1 is a diagram to show the relationships between order by subgroup (subgroup size: 5 samples) and the discharging current (Ad).

FIG. 5-3.1 is a diagram showing the two kinds of battery distribution of measurements in the Histogram.

FIG. 5-3.2 is a diagram to show the shape of the normal distribution.

FIG. 5-3.3 is a diagram showing the edge peak distribution similar to the normal distribution except that it has a large peak at one tail. Some battery data are mixing from the other production lot.

FIG. 5-3.4 is a diagram showing the bimodal distribution looks like the back of a two-humped camel which can be two-shift or two-equipment battery data in the same production lot.

FIG. 5-3.5 is a diagram to show the Cog-toothed (or Combed) shape; rounded-off battery data are errors and/or an incorrectly constructed in a combed distribution.

FIG. 5-3.6 is a diagram showing the truncated (or heart-cut) shape; the truncated distribution looks like a normal distribution with the tails cut off. Incompletely reported battery data or measured after inspection has rejected items outside specification limits as represented.

FIG. 5-3.7 is a diagram to show the battery specifications, and the battery process capability of quality characteristics will be assessed based on normal-distribution battery data.

FIG. 5-4.1 is a diagram to show the difference of two charts from run chart to control chart. The battery data from measurements of variations at key control points on the process-mapping is monitored using control charts.

FIG. 5-5.1 is a flow chart for showing different stages how to develop a robust statistical quality control in a cloud-computing mechanism, and promptly and effectively monitor the dominated quality characteristics of Lithium batteries.

FIG. 5-5.2 is a contrastive box plot with different categories of Lithium battery.

FIG. 5-5.3 is a contrastive individual value plot with different categories of Lithium battery.

FIG. 5-5.4 is a contrastive multi-variable chart with different categories of Lithium battery.

FIG. 5-5.5 is a contrastive time series plot with different categories of Lithium battery. FIGS. 5-5.2 to 5-5.5 are useful to isolate the critical issues of the problem among many different potential issues thus simplify the process of identifying a solution to a seemingly complex problem.

DETAILED DESCRIPTION OF THE PREFERRED EMBODIMENTS

Figure 1:
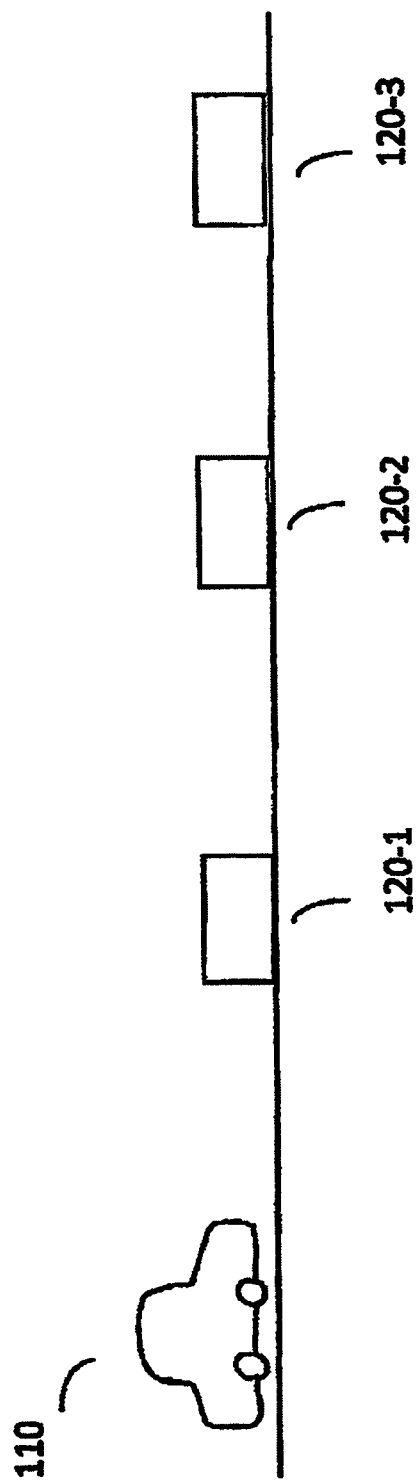
FIG. 1 is a functional diagram for showing a system and method for removing depleted car batteries from a car and installing the freshly charged batteries to the vehicle of this invention.

FIG. 1 is a diagram for showing a system and method for supplying energy town electrically powered vehicle 110 The system includes a plurality of "battery refueling stations" 120-1, 120-2 and 120-3. Each of these battery refueling stations have freshly charged batteries ready to be installed onto the vehicle 110. The vehicle 110 as an electrically powered vehicle has depleted batteries after driving a certain distance finds out there is a battery refueling station 120-2 on the roadside. The driver drives the car 110 into the refueling station 120-2. The service persons in the battery refueling station 120-2 remove the depleted batteries from the vehicle 110 and install freshly charged batteries onto the car 110. In this system the vehicle owners may lease the batteries from a leasing company that either owned or alliance with the refueling station. The battery refueling stations charge the vehicle owners for the services and the vehicle owners do not have to wait for the battery to be charged in the refueling stations. The batteries of the vehicle are implemented with batteries that comply with certain standard sizes, configurations and connections which satisfy the auto maker specification. The removal and installation of the batteries can be conveniently carried out.

FIG. 2 is a diagram for showing a battery 180 of this invention. The battery 180 includes a 190-BMS system compose of IC chip 190 and an RFID for identifying the battery. This IC chip 190 may be implemented as a monitoring system on chip as part of automobile Battery Management System (BMS) to record the actual usage behavior and environmental conditions It may, as an option, include sensing elements for detecting and measuring important parameters of battery conditions As will be further shown in an alternate embodiment, the battery health sensing IC chip 195 in FIG. 3 are implemented in a battery charge device operated in the refueling station 120. The sensing system implemented on the IC chip 190 carries out the tasks of sensing and detecting the measurements of these parameters for the purpose of monitoring and maintaining the battery 180 in good and healthy conditions. It is to be noted that the sensing and refueling management functions performed by a monitoring and controlling system on chip 195 when implemented in a charging device is very different from a BMS IC chip 190 installed on an automobile. In order to effectively carry out the "battery refueling" process by exchanging a depleted battery with a fully charged battery at the refueling station 120-1, 120-2, 120-3, etc., it is required that the batteries 180 are made with standard size and configuration such that the batteries can be conveniently exchanged. Furthermore, in order to assure safely operation and reliable performance to power the vehicle, it is also preferred that the batteries are certified either by an automobile manufacturer, or creditable battery manufactured, or other independent institutes qualified to certify the batteries.

Figure 2B:
FIG. 2B is diagram to show a battery pack with battery management system (BMS) which may be integrated with auto maker. It may also be a separated BMS specifically for safety and life monitoring system incorporated by battery leasing company.

FIG. 2B is a diagram for showing a battery pack safety and life monitoring system as an alternate embodiment of this invention. The battery pack safety and life monitoring system includes a battery charger that incorporates a battery health checkup system. The battery pack safety and life monitoring system also includes a battery monitoring system (BMS). The car makers often install a BMS system on a vehicle to monitor and to reliably estimate the remaining capacity in the battery. Unless an agreement is achieved between the Car maker and the Battery maker, this safety BMS 190 may act independently without interference the BMS which auto maker installed. Both intelligent battery charger (FIG. 2C) and Battery pack with MBS 190 (FIG. 2B) have internet link to transmit signals including measured data for indicating the heath states of the battery through Internet as that further described below.

Figure 2C:
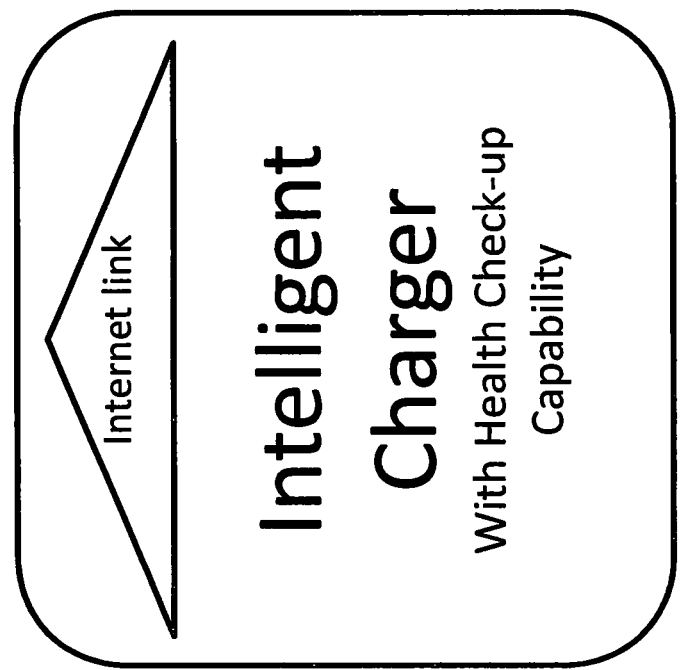
FIG. 2C shows an intelligent charger incorporating a battery health check-up system.
Figure 3:
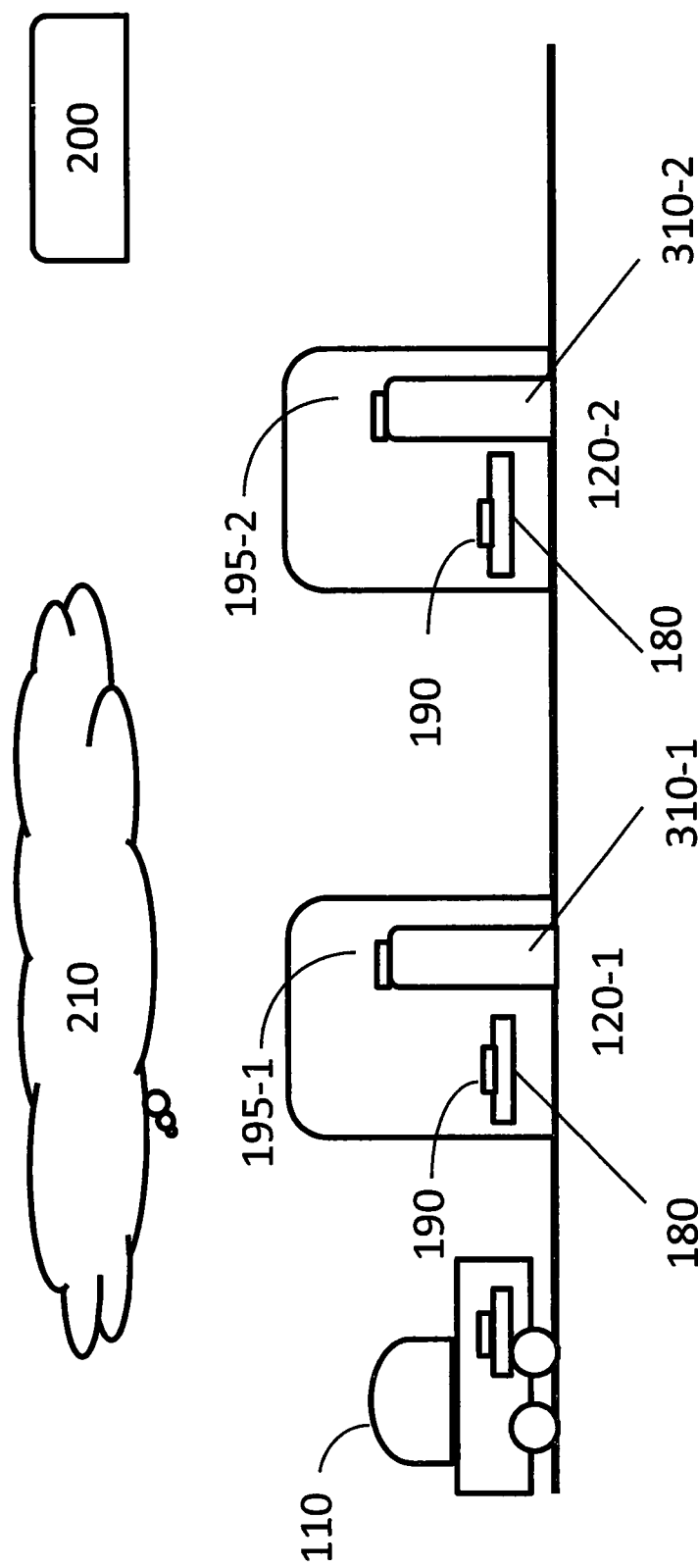
FIG. 3 is a diagram for showing a signal transmission system implemented with cloud computing technologies for transmitting the detected parameters of the batteries from the battery BMS or intelligent charging system to a receiver in order to monitor and properly maintain the health operation of the batteries.

FIG. 2C shows a BMS-IC chip 195 of the battery pack safety and life monitoring system implemented in a charging station. The intelligent charger with the health checkup capability as discussed before is provide to monitor and control different sets of battery parameters than the BMS installed on a vehicle by an auto maker. The intelligent charger may be designed and implemented to read the identification (ID) of each battery pack wherein the battery cells may be linked preferably in parallel. The ID may be embedded in a RFID chip installed on each battery. The BMS system may further be implemented to read and store the charging station ID. The battery pack safety and life monitoring system may be implemented to measure the DC impedance and AC impedance of each battery pack. The measurements are carried out during a constant current charging operation before reaching a set battery voltage of the battery under charge. The measurement data includes a voltage versus time variation and the total accumulated charge. Further measurement includes the temperature variations during charge and other parameters for diagnosing the health state and any potential problems of the batteries under charge in each charging operation. The measurement data are transmitted through the Internet link to a data collection and analysis center for monitoring and analyzing the operational conditions of each of the batteries charged in each of the battery refueling stations. The Internet link may be established through wired personal computer, wireless transmission routers or Wi-Fi/WiMAX connections.

Figure 4:
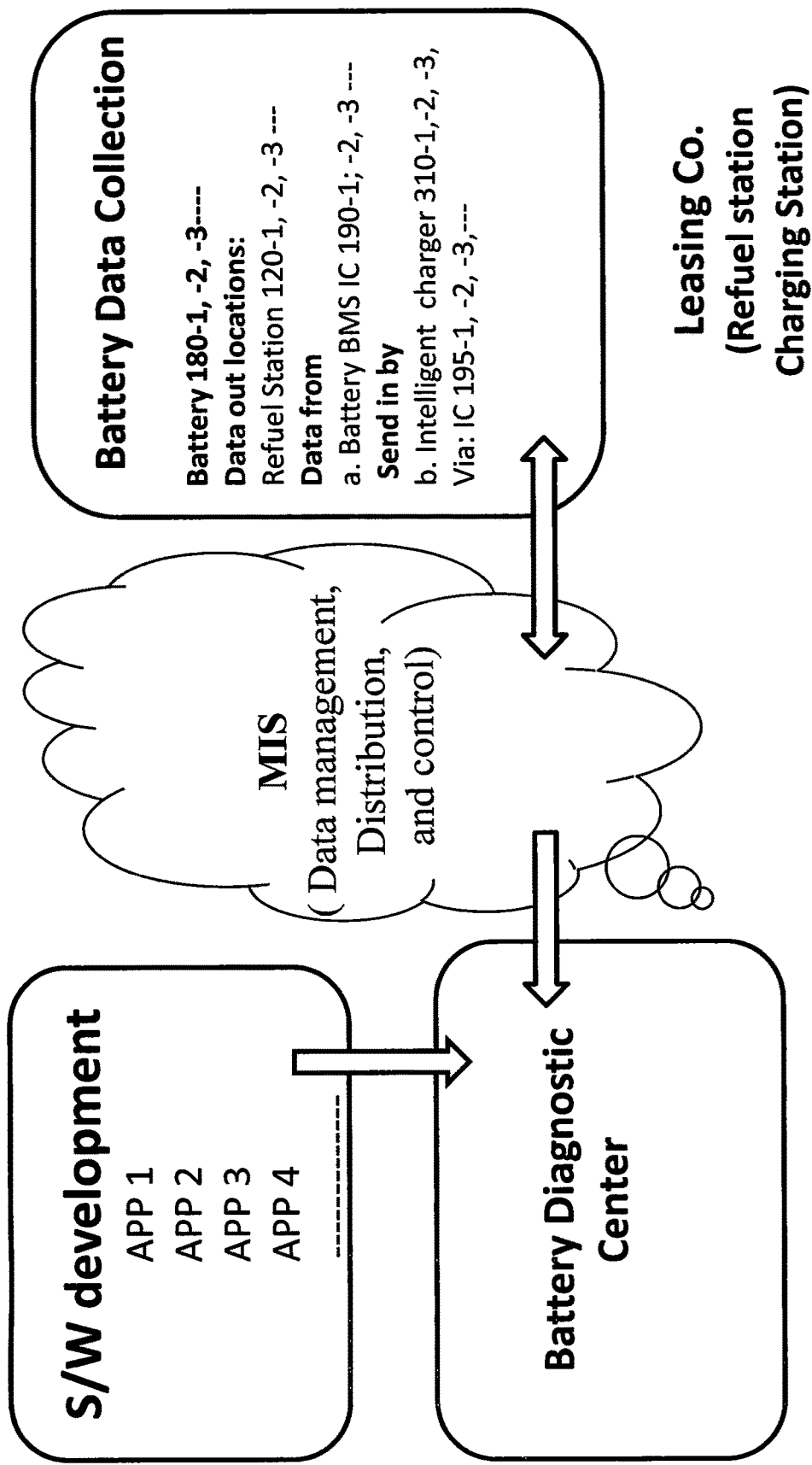
FIG. 4 is a diagram for showing a system configuration diagram transmission system implemented with cloud computing technologies via management information system (MIS) for transmitting the detected parameters of the batteries to a receiver in order to monitor and properly maintain the health operation of the batteries.

FIG. 3 is a functional block diagram for showing a system and method to continuously monitor the condition of the battery 180 of this invention. The IC chip 1951 implemented on intelligent battery charger 310-1 in the refuel station 120-1 and IC chip 190 implemented on the battery 180. The data on both Battery 180 IC chip 190 and IC chip 195-1 on intelligent charger 310-1 at refueling station 120-1, IC chip 195-2 on intelligent charger 310-2 at refueling station 120-2, etc. further transmit by means of internet link to the data center 200. The data transmitted from the IC chip 190 on battery 180, may be done at refueling station where the internet network is available. The signals are transmitted as wireless signals through local area network (LAN) or a Wi-Fi/WiMAX system by applying the cloud computing technology for transmitting through an Internet system 210 to a signal receiver 200. The signal receiver may be a receiver disposed on a battery monitoring and controlling center that may be implemented as a data collection center as shown in FIG. 4 blow. The receiver 200 may also be disposed in one of the refueling stations 120. The signals are received and processed and applied to monitor and maintain the batteries such that the batteries implemented to power the vehicle may be well kept and well operated.

FIG. 4 is a functional block diagram for illustrating the overall data flow and control signals of a battery charging, monitoring, data collection, analysis and control system. On the rightmost side, the data collection processes are carried out during the charge operations at refuel station. The data collected includes the Lithium battery (LiB) operation data and charging data. These data may be collected and provided in the charging stations and the BMS installed on the battery pack by the automaker, battery rental, or a battery operation company The data collected are transmitted through the Internet links to a database in a data collection center that can be operated as a battery cloud data corporation. The cloud data corporation takes care of the data transmission and distribution processes according to mutually agreed data sharing privileges. The data collected is further analyzed by a data analysis and application entity that develops, maintains and operates data analysis software programs These data analysis programs are shown as Application Programs APP1, APP2, and APP3, etc. The analyzed data is anther transmitted to a control center shown on the leftmost side of the diagram that control the total battery recharge processes according to the data analyzed by the data analysis and application software. The data collected and the analyzed when applied by the control center to control the entire operational processes may also be provided to the insurance companies, the battery pack makers or automakers according to the needs of these data in each of these operational entities.

The data analyses performed in the data analysis and application system shown in FIG. 4 are carried out for every battery pack with the past history of battery operation by applying a statistical process control (SPC). during each charge operation. When there is any abnormity detected, a warning message is sent to the charge station or a vehicle driver such that the battery can be removed from the fully-charged battery storage rack in the charge station. Upon detecting the abnormality of a battery pack, a message can also be sent to a battery pack supplier with the necessary data such that the problems and technical issues that cause the abnormal battery conditions can be resolved soon after such problems are detected. Therefore, a system may be setup to exchange the collected and analyzed data with some stored in the database through a system of value chains. The value chains of data and information exchanges may include every parties involved in the manufacturing, repairing, operation, charging, and insure the safe and reliable operation of the vehicles powered by the batteries. These parties of value exchanges including monetary or other types of commercial exchanges can and limited to battery pack manufacturer, automakers, charge stations, auto insurance companies, highway safety agencies, and other related parties. The data as collected and analyzed may also be applied to certify batteries and classify batteries into different grades depending on applications and situations of these batteries in providing the power to different types of vehicles.

For the purpose of establishing a standard for monitoring, managing and controlling the working environment and a safe operation of the batteries and also to make, sure that data collections and analyses are properly carried out, this invention implements a special battery monitoring statistical analysis process. The battery monitoring statistical analysis process is implemented to detect deviations or abnormal battery conditions during the lifetime of the batteries to assure all the batteries are managed and maintained to operate in safe and reliable conditions. The battery monitoring statistical analyses processes collect and apply all data that may potentially influence the operations and accuracies of the entire monitoring processes. The data may include but not limited to data pertaining to the working environment such as temperature and humidity of the charging stations, members of each of the working teams such as name and working experience of the persons who operate the charging device, the details of the battery charging processes, the type and model numbers of the charging devices, the details of the measuring devices applied for measuring the data, etc.

The charge stations have charging process monitoring systems that automatically collect all the data as described above. Statistical analyses are then performed on these data as will be further described below to continuously monitor the health conditions of the batteries. Examples of data collection by the battery monitoring systems include the identification number of battery (battery ID No.), vehicle ID number that operates with a battery at certain time periods, the charging voltage Vc, e.g., 110V or 220V, 50.about.60 Hz, battery discharging voltage Vd, e.g., 24V.about.48V, battery charging current Ac, e.g., 10 A.about.20 A, battery discharging current Ad, e.g., 10 A, battery capacity Wb, e.g., 22 KWH, battery charge time Tc, e.g., 10 Hours, battery discharge time Td, e.g., 45.8 Hours, percentage of battery charged, e.g., 50% when the battery is charged only 5 hours instead of 10 hours to fully charge the battery.

Figure 5:
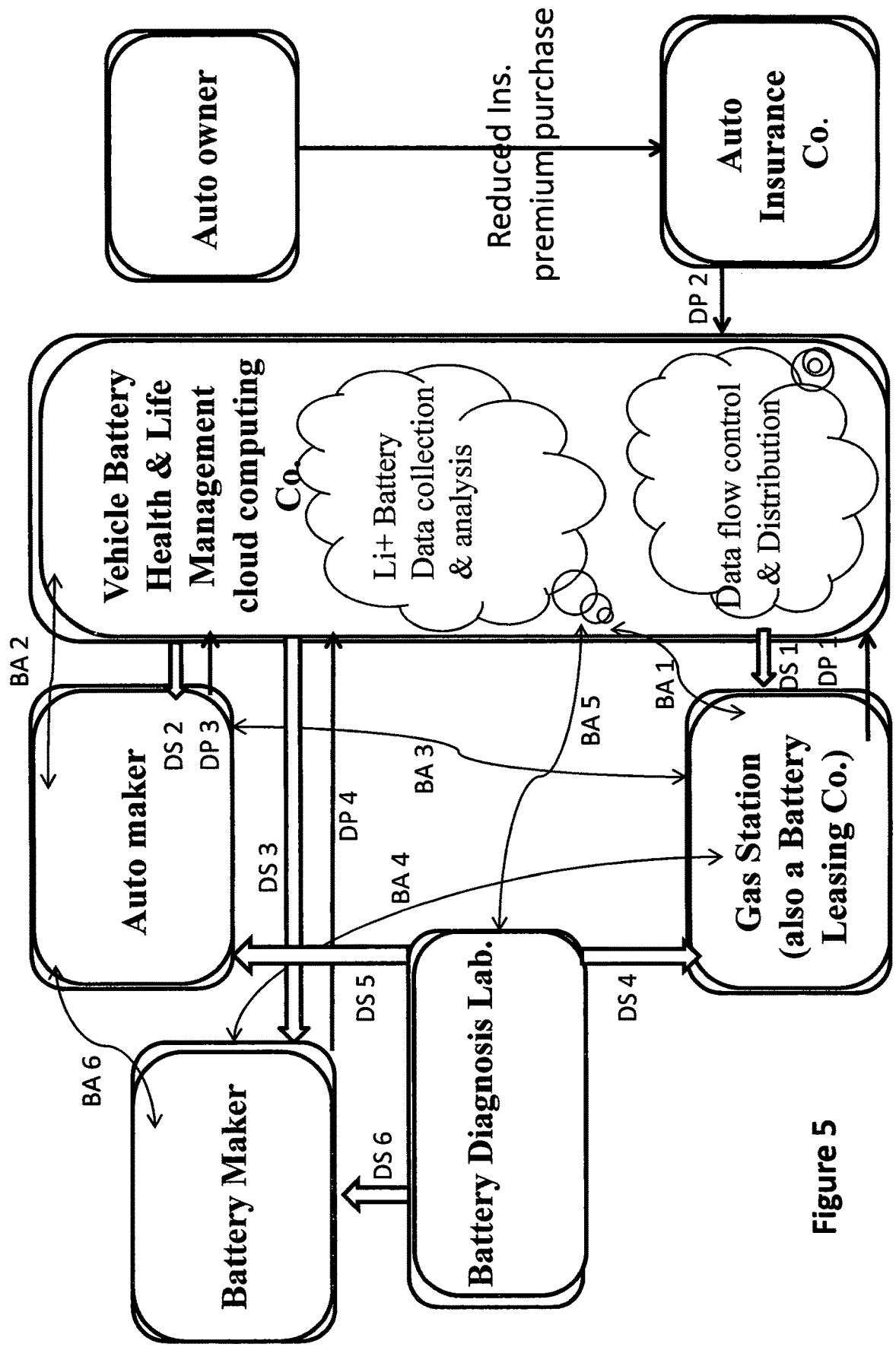
FIG. 5 is a functional block diagram for showing a system configuration diagram of the functional relationships, data paths and flow of diagnoses and analyses results.

FIG. 5 is a functional block diagram to illustrate the processing and transmission paths of the life and health battery data. The functional block diagram also clearly illustrates some of the benefits generated by implementing the battery charging and monitoring system of this invention. Specifically, a vehicle battery health and life management company (V-BHLMC) is established that operates with cloud company capabilities to collect all the life and health data of all the batteries recharged by the charging and monitoring systems of this invention as that shown in FIGS. 1 to 4 above. The life and health data are collected according to a data purchase (DP) agreement DP1 and also a business alliance (BA), i.e., BA1, between the VBHLMC and the refueling stations and also the battery leasing company. The vehicle battery health and life management company (V-BHLMC) also applies the statistical quality control (SQC) analyses described above to track and detect if any potential health problems of all the batteries. Some of the data collected and results of battery health analysis results, especially an alarm of abnormal battery health for certain batteries are provided to the battery refueling stations and battery leasing companies as part of a diagnosis service (DS), i.e., DS1 between the V-BHLMC and the refueling station and the battery leasing company. Under a separate data purchase (DP) agreement DP2, the auto insurance company may also purchase part of the battery life and health data or the SQC analysis results from the V-BHLMC. With additional data and information made avail to the auto insurance company, a benefit of reducing the auto insurance premium may be realized because the risks of events caused by battery abnormal operations are reduced. FIG. 5 further illustrates that there are data purchase DP agreements, business alliance BA agreements, and diagnosis service DS agreements between many different business entities including the V-BHLMC, the battery refueling station and the battery leasing company, the auto maker, and the battery maker.

A technique of structural differentiation method is applied to collect the data according to different data categories. When the data are collected and organized into different categories, the characteristic differences of an abnormal data can be quickly differentiated. A complex technical problem when organized according to different categories, the data presented with these different categories can be very useful to isolate the critical issues of the problem among many different potential issues thus simplify the process of identifying a solution to a seemingly complex problem For example, once the battery discharging current (Ad) is collected from charge station of electrically powered vehicles, it will compare with Ad of the same production lot immediately. The production batteries in the same lot can be identified by the battery barcode records of electrically powered vehicles. In addition, the differentiation of the two batteries can be figured out (see the FIG. 5.1-1) by stratify the collected discharging current (Ad) data through the suitable statistical tool, and can further proceed the data analysis and conduct a valuable decision-making.

Run chart: Run charts are analyzed to discover anomalies in data which suggest shifts in a process over time scale (eg, days, weeks, months, quarters) or special factors on the horizontal axis that may be influencing the variability of a process. The vertical axis represents the quality indicator such as discharging current (Ad), discharging voltage (Vd), charge time (Tc), discharge time (Td), etc. Normally, the median is calculated and employed as the chart's centerline because it provides the point where half the observations are expected to be above and below the centerline and will not be influenced by extreme values in the data. Besides, target lines and annotations of significant changes and other events can also be put into the run chart. FIG. 5.2-1 describes the relationships between order by subgroup (subgroup size: 5 samples) and the discharging current (Ad) for battery B0001. As a result, the, run chart can, evaluate the status and trend for each of batteries, and further make a troubleshooting diagnosis and processing.

Histogram: The Histogram represents the frequency distribution across a set of measurements as a set of physical bars, and the width of each bar is constant and delicates a fixed range of measurements (say sets). The height of each bar is proportional to the number of above range of measurements. Overall shape shows the distribution of measurements can be seen far more clearly in the Histogram as shown in FIG. 5-3.1. All the collected measurement data, whose minimum data numbers need to greater than or equal to 50 and the best is greater than 100, can be altered in terms of time periods, production lots, operational workers, and so forth. The normal way to determine the Histogram sets conform to the range of data numbers as represented in Table 1. The main causes on data-measured differentiation are errors for accuracy (e.g., bias, linearity and stability) and precision of measurement system. The judgments of precision can be denoted below:

Repeatability: The variance of equipment occurs on the same measurement instrument, same measurement operator, and same measurement sample.

Reproducibility: The variance of appraiser results from the same measurement instrument, same measurement sample, and different measurement appraisers.

Parts variance: occurs on the same measurement instrument, same measurement operator, and different measurement samples.

TABLE 1

| Collected data number | sets |
|---|---|
| 50~100 | 6~10 |
| 100~250 | 7~12 |
| 250 or Greater | 10~20 |

A exemplar for evaluating the Histogram sets can be developed, and the collected 100 data of discharging current (Ad) in the same production lot can be seen in Table 2.

TABLE 2

| 9.94 | 9.93 | 10.00 | 9.98 | 9.94 | 10.00 | 9.97 | 10.01 | 10.07 | 9.89 |
|---|---|---|---|---|---|---|---|---|---|
| 9.99 | 10.02 | 9.98 | 9.91 | 9.98 | 9.94 | 9.96 | 9.92 | 9.96 | 9.97 |
| 9.92 | 10.03 | 10.09 | 9.95 | 10.00 | 9.94 | 9.97 | 9.98 | 9.93 | 9.94 |
| 10.07 | 9.98 | 9.97 | 9.95 | 10.05 | 9.92 | 9.95 | 9.97 | 9.93 | 10.00 |
| 9.98 | 9.96 | 9.95 | 9.98 | 9.99 | 10.03 | 10.02 | 10.00 | 9.98 | 9.90 |
| 9.88 | 10.05 | 9.97 | 9.97 | 9.96 | 10.01 | 9.91 | 10.01 | 9.97 | 9.93 |
| 9.99 | 9.96 | 9.95 | 9.99 | 9.97 | 9.96 | 10.00 | 9.96 | 10.03 | 10.05 |
| 9.98 | 9.96 | 10.03 | 10.02 | 9.97 | 10.03 | 9.99 | 9.96 | 10.01 | 9.95 |
| 9.96 | 9.95 | 9.99 | 9.98 | 9.93 | 9.97 | 10.00 | 9.96 | 10.02 | 9.97 |
| 9.97 | 10.00 | 10.01 | 10.00 | 9.99 | 10.05 | 10.00 | 9.90 | 10.05 | 9.97 |

According to the Table 2, the collected data numbers are N=100, and the number of sets (Ns) is selected by 10. Moreover, the maximum value a=10.09 and the minimum value is 9.8, and the range R=10.09-9.88=0.21, C=R/Ns=0.21/10=0.021; furthermore, C=0.02 is set by the measurement unit equals to 0.01, and boundary value is set to 0.005 (i.e., 0.01 divided by 2). The distributed frequency can be represented in Table 3.

TABLE 3

| Set No. | Lower Limit | Center | Upper Limit | Frequency Distribution | No. of Times |
|---|---|---|---|---|---|
| 1 | 9.88 − 0.005 = 9.875 | 9.885 | 9.875 + 0.02 = 9.895 | II | 2 |
| 2 | 9.895 | 9.905 | 9.895 + 0.02 = 9.915 | IIII | 4 |
| 3 | 9.915 | 9.925 | 9.915 + 0.02 = 9.935 | 卅 III | 8 |
| 4 | 9.935 | 9.945 | 9.935 + 0.02 = 9.955 | 卅卅 II | 12 |
| 5 | 9.955 | 9.965 | 9.955 + 0.02 = 9.975 | 卅卅卅卅卅 | 25 |
| 6 | 9.975 | 9.985 | 9.975 + 0.02 = 9.995 | 卅卅卅 II | 17 |
| 7 | 9.995 | 10.005 | 9.995 + 0.02 = 10.015 | 卅卅卅 | 15 |
| 8 | 10.015 | 10.025 | 10.015 + 0.02 = 10.035 | 卅 II | 9 |
| 9 | 10.035 | 10.045 | 10.035 + 0.02 = 10.055 | 卅 | 5 |
| 10 | 10.055 | 10.065 | 10.055 + 0.02 = 10.075 | II | 2 |
| 11 | 10.075 | 10.085 | 10.075 + 0.02 = 10.095 | I | 1 |

Common Histogram shapes are normal distribution: divided by its symmetry axis shown in FIG. 5-3.2. Problems may be indicated by the distribution being naturally non-bell-shaped or by problems with the measurement. When a distribution differs from the expected normal (bell-shaped) shape such as Isolated-peaked (Edge-peak), dual-peaked (bimodal), Cog-toothed (or Combed), Truncated (or heart-cut), etc., the underlying process should be reviewed to come across real causes of this.

Isolated-peaked (Edge-peak) shape: The edge peak distribution is similar to the normal distribution except that it has a large peak at one tail (FIG. 5-3.3). Normally, this is caused by faulty construction of the histogram; for example, some battery data mixing from the other production lot.

Double-peaked or bimodal shape: The bimodal distribution looks like the back of a two-humped camel. The outcomes of two processes with different distributions are combined in one set of data. For instance, a distribution of two-shift or two-equipment battery data in the same production lot might be bimodal as shown in FIG. 5-3.4.

Cog-toothed (or Combed) shape: In a combed distribution, the bars are alternately tall and short, which can be seen in FIG. 5-3.5. This distribution often results from data-processing problems: rounded-off battery data errors and/or an incorrectly constructed histogram.

Truncated (or heart-cut) shape: The truncated distribution looks like a normal distribution with the tails cut off. The battery supplier might be producing a normal distribution of material and then relying on inspection to separate what is within specification limits from what is out of spec. Incompletely reported battery data or measured after inspection has rejected items outside specification limits as represented in FIG. 5-3.6.

Comparing with the battery specifications, the battery process capability of quality characteristics will be assessed based on normal-distribution battery data as shown in FIG. 5-3.7.

Control chart: An advantage of SPC over quality control, such as "inspection", which emphasizes early detection and prevention of problems to eliminate the on-site abnormal causes of characteristics, rather than the correction of problems after they have occurred. The battery data from measurements of variations at key control points on the process-mapping is monitored using control charts. FIG. 5-4.1 illustrates the difference of two charts from run chart to control chart.

Control charts can be categorized into two groups: one group is for counting value (i.e., discrete attributes such as defect numbers, flaws, accidences, etc.), and the other is for variable value (i.e., continuous variables such as length, weight, time period, etc.). Moreover, control charts usually have two types as described below, and their definition, computing formula and identification methodologies of abnormal points can be in reference to contexts of the statistical quality control (SQC) materials.

variable value: x-R chart, x-S chart, x-Rm chart, etc.

counting value: np chart, p chart, u chart, c chart.

To assure that the product can satisfy the customer requirements and effectively monitor and promptly improve the quality of products, the working environmental control and on-site data monitoring system of electrically powered vehicles will be completely established. As a result, the SPC system will play a critical role to manage and monitor car-battery for safely and effectively supply energy to electrically powered vehicles. Moreover, the cost benefit will be highly raised, and the proposed methodologies will make a great progress via PDCA cycles.

A special business alliance BA5 agreement is established between the V-BHLMC and a battery diagnosis laboratory such that a large amount of data collected by the V-BHLMC are further analyzed and selected abnormal batteries are further tested in the diagnosis laboratory. As the V-BLHMC conducts the SQC analyses to large number of batteries, the purpose is to differentiate and identify particular batteries that are abnormal for sending alarm signals to replace or repair these batteries. However, the V-BLHMC is not provided with technical expertise to identify the fundamental or real technical problems of the abnormal batteries. The battery diagnosis laboratory performs tests and analyses to determine and confirm the problems and also find out solutions to resolve the technical issues behind these abnormal operation conditions. Therefore, Li+ Battery data collection & analysis executed by battery diagnosis lab, and data flow control & distribution implemented by gas station also battery leasing Co. under a flow chart for a robust SQC control; all the databases integrated by V-BHLMC cloud computing Co.

FIG. 5-5.1 showing a SQC flow chart which falls into three stages can be shown below: Stage 1. Arrange some of the sensors-collected sampling data and detailed descriptions thereof. Stage 2 Analyze the above sampling data through quality control seven tools—histogram, box plot, individual value plot, multi-vari chart and time series plot, and coefficient of variation (CV), coordinate with project team to diagnosis the root causes of the defect deviations or abnormal symptoms, and further determine the required control parameters and monitoring quality characteristics. Stage 3. Setup SPC and cloud-computing mechanism to promptly and effectively monitor the dominated quality characteristics.

A technique of structural differentiation method using multi-dimensional scaling (usually in two dimensions) is applied to collect and analyze the data according to different data categories. The data presented graphs with these different categories such as box plot, individual value plot, multi-vari chart and time series plot (see FIGS. 5-5.2 to 5-5.5) can be very useful to isolate the critical issues of the problem among many different potential issues thus simplify the process of identifying a solution to a seemingly complex problem.

Coefficient of variation (CV): A coefficient of variation delicates the measure of relative variability, which equals to the standard deviation divided by the mean, and normally expressed as a percentage. Because it is a dimensionless number, It is useful in comparing the dispersion of populations with significantly different means.

While specific embodiments of the invention have been illustrated and described herein, it is realized that other modifications and changes will occur to those skilled in the art. It is therefore to be understood that the appended claims are intended to cover all modifications and changes as fall within the true spirit and scope of the invention.

The invention claimed is:

1. A system for managing rechargeable batteries to provide power to electrical vehicles comprising:
a plurality of charging stations each includes at least an intelligent battery charger for charging the rechargeable batteries;
the intelligent battery chargers further comprises a battery diagnostic detector for detecting and storing data of designated battery health management parameters; and
the intelligent battery chargers further comprises a transmitter for transmitting the data of the designated battery health management parameters as wireless signals to a networked server in a battery management center wherein the battery management center continuously collects battery health management parameters from the plurality of charging stations and categorizes the health management parameters into different categories according to a time sequence to perform statistical data analyses on the battery health management parameters collected for detecting an abnormal condition of a rechargeable battery.

2. The system of claim 1 wherein:
the batteries further comprise a battery health state monitoring sensor implemented as an integrated circuit (IC) chip on the rechargeable batteries for detecting and storing data of battery health state parameters including discharge currents (Ad), discharging voltages (Vd), a charge time (Tc), and a discharge time (Td) during the intelligent charger charges the rechargeable batteries.

3. The system of claim 1 wherein:
the battery management center continuously collects the battery health management parameters from the plurality of charging stations including discharging current (Ad) for comparing discharging current (Ad) of a plurality of batteries from a same production lot for detecting the abnormal condition of a rechargeable battery.

4. The system of claim 2 wherein:
the battery management center continuously collects and analyzes the battery health management parameters from the plurality of charging stations for detecting the abnormal condition of a rechargeable battery and the battery management center sends a warning message to a charge state or a vehicle driver when the abnormal condition of a rechargeable battery is detected.

5. The system of claim 3 further comprises:
the battery management center continuously collects and analyzes the battery health management parameters from the plurality of charging stations for detecting the abnormal condition of a rechargeable battery and the battery management center sends a message to a battery pack supplier with necessary data of the abnormal condition for resolving technical issues that cause the abnormal condition.

6. The system of claim 1 wherein:
the battery management center continuously collects and analyzes the battery health management parameters from the plurality of charging stations for maintaining and continuously monitoring conditions of each of the rechargeable batteries and the battery management center sends the battery health management parameters to a battery pack supplier, a battery manufacturer, an insurance company, a highway safety agency and an automaker as commercially or technically required.

7. The system of claim 4 wherein:
the battery management center continuously collects and analyzes the battery health management parameters from the plurality of charging stations for maintaining and continuously monitoring conditions of each of the rechargeable batteries and the battery management center applies the battery health management parameters and the conditions of a plurality of the rechargeable batteries to certify and classify the rechargeable batteries into different categories.

8. The system of claim 1 wherein:
each of the rechargeable batteries further includes an RFID as an identity that is electronically identifiable by the intelligent battery chargers and the battery management center.

9. A method for managing rechargeable batteries to provide power to electrical vehicles comprising:
implementing at least an intelligent battery charger in a plurality of charging stations for charging the rechargeable batteries;
installing a battery diagnostic detector on the intelligent battery chargers detecting and storing data of designated battery health management parameters;
installing a transmitter on the intelligent battery charges for transmitting the data of the designated battery health management parameters as wireless signals to a networked server in a battery management center; and
detecting an abnormal condition of a rechargeable battery in the battery management center by continuously collecting battery health management parameters from the plurality of charging stations and categorizing the health management parameters into different categories according to a time sequence to perform statistical data analyses on the battery health management parameters collected.

10. The method of claim 9 further comprising:
implementing a battery health state monitoring sensor as an integrated circuit (IC) chip on the rechargeable batteries for detecting and storing data of battery health state parameters including discharge currents (Ad), discharging voltages (Vd), a charge time (Tc), and a discharge time (Td) during the intelligent charger charges the rechargeable batteries.

11. The method of claim 9 wherein:
the step of continuously collecting the battery health management parameters from the plurality of charging stations further includes a step of collecting and comparing discharging current (Ad) of a plurality of batteries from a same production lot for detecting the abnormal condition of a rechargeable battery.

12. The method of claim 9 wherein:
the step of continuously collecting the battery health management parameters from the plurality of charging stations and continuously categorizing and analyzing the battery health management parameters from the plurality of charging stations for detecting the abnormal condition of a rechargeable battery further includes a step of sending a warning message to a charge state or a vehicle driver when the abnormal condition of a rechargeable battery is detected.

13. The method of claim 9 wherein:
the step of continuously collecting the battery health management parameters from the plurality of charging stations and continuously categorizing and analyzing the battery health management parameters from the plurality of charging stations for detecting the abnormal condition of a rechargeable battery further includes a step of sending a message to a battery pack supplier with necessary data of the abnormal condition therefore technical issues that cause the abnormal condition can be resolved.

14. The method of claim 9 wherein:
the step of continuously collecting the battery health management parameters from the plurality of charging stations and continuously categorizing and analyzing the battery health management parameters from the plurality of charging stations for detecting the abnormal condition of a rechargeable battery further includes a step of sending the battery health management parameters to a battery pack supplier, a battery manufacturer, an insurance company, a highway safety agency and an automaker as commercially or technically required.

15. The method of claim 9 wherein:
the step of continuously collecting the battery health management parameters from the plurality of charging stations and continuously categorizing and analyzing the battery health management parameters from the plurality of charging stations for detecting the abnormal condition of a rechargeable battery further includes a step of applying the battery health management parameters and the conditions of a plurality of the rechargeable batteries to certify and classify the rechargeable batteries into different categories.

16. The method of claim 9 further comprising:
installing on each of the rechargeable batteries an RFID chip as an identity that is electronically identifiable by the intelligent battery chargers and the battery management center.

17. The method of claim 9 wherein:
the step of continuously collecting the battery health management parameters from the plurality of charging stations further includes a step of collecting and comparing the battery health management parameters of a plurality of batteries during a lifetime of the rechargeable batteries to maintain the batteries to operate in a safe and reliable condition.

18. The method of claim 9 wherein:
the step of continuously collecting the battery health management parameters from the plurality of charging stations further includes a step of collecting and comparing the battery health management parameters of a plurality of batteries and further including a step of monitoring and collecting all data that may potentially influence operations and accuracies of battery charging processes including working environment conditions including temperature and humidity of the charging stations, members of each of the working teams such as name and working experience of the persons who operate the charging device, the details of the battery charging processes, the type and model numbers of the charging devices, the details of the measuring devices applied for measuring the data.

19. The method of claim 9 wherein:
the step of continuously collecting the battery health management parameters from the plurality of charging stations further includes a step of collecting and comparing the battery health management parameters of a plurality of batteries and further including a step of constructing histograms of measurements of the health management parameters for applying the histograms to determine a repeatability, reproducibility, and a part variance of measurements performed by the charging stations.

* * * * *